United States Patent
Yang et al.

(10) Patent No.: US 7,432,956 B2
(45) Date of Patent: Oct. 7, 2008

(54) METHODS AND SYSTEMS FOR PROVIDING IMAGES AND RELATED DEVICES

(75) Inventors: Cheng-Fu Yang, Yi-Lan Hsien (TW); Ching-Lin Hsu, Tai-Chung Hsien (TW)

(73) Assignee: Mediatek Incorporation, Hsin-Chu (TW)

( * ) Notice: Subject to any disclaimer, the term of this patent is extended or adjusted under 35 U.S.C. 154(b) by 627 days.

(21) Appl. No.: 10/989,240

(22) Filed: Nov. 15, 2004

(65) Prior Publication Data

US 2006/0103735 A1     May 18, 2006

(51) Int. Cl.
*H04N 5/225* (2006.01)
(52) U.S. Cl. .................................. 348/218.1
(58) Field of Classification Search ............... 348/218.1, 348/283, 320, 302, 239; 382/284, 294
See application file for complete search history.

(56) References Cited

U.S. PATENT DOCUMENTS

| | | | |
|---|---|---|---|
| 5,481,303 A * | 1/1996 | Uehara | 348/231.1 |
| 5,880,778 A * | 3/1999 | Akagi | 348/218.1 |
| 6,720,997 B1 * | 4/2004 | Horie et al. | 348/218.1 |
| 6,952,224 B2 * | 10/2005 | Martins et al. | 348/222.1 |
| 7,286,170 B2 * | 10/2007 | Inui et al. | 348/241 |
| 2002/0003892 A1 * | 1/2002 | Iwanaga | 382/124 |
| 2004/0165076 A1 * | 8/2004 | Nishimura et al. | 348/211.2 |

FOREIGN PATENT DOCUMENTS

CN         1151441         5/2004

OTHER PUBLICATIONS

China Office Action mailed Apr. 6, 2007.

\* cited by examiner

*Primary Examiner*—David Ometz
*Assistant Examiner*—Gary C Vieaux
(74) *Attorney, Agent, or Firm*—Thomas, Kayden, Horstemeyer & Risley

(57) ABSTRACT

Methods for providing images. First, a target image is partitioned into a plurality of partial images according to the available memory capacity and the size of the target image. Thereafter, one of the partial images is respectively captured and transmitted from a device with a camera capability to a host. The partial images are combined to generate the target image on the host.

22 Claims, 6 Drawing Sheets

METHODS AND SYSTEMS FOR PROVIDING IMAGES AND RELATED DEVICES

BACKGROUND

The present disclosure relates generally to methods and systems for providing image, and more particularly, to methods and systems for image capture and transmission, and related devices.

Camera tuning is an important step for adjusting camera sensors, such as its image colors, before it leaves the factory. In camera tuning, target image data without compression must be dumped from a camera system to a computer for tuning or analysis. Conventionally, a full size image must be saved in the camera system memory before being transmitted to the computer. Generally, there is no problem for a camera system to capture an image when the available memory capacity exceeds the image size.

However, since the image size is as large as the pixel capacity of the sensor, if a large view must be captured, large memory capacity will be required. For example, a VGA size image will occupy 900 KB of memory and a SXGA size image will occupy around 4 MB of memory. In an embedded system, such as a mobile phone with a camera capability, memory resources are very tight and no additional memory can be allocated for tuning. The memory limitation becomes an obstruction for image processing in the embedded system.

SUMMARY

Methods and systems for providing images, and related devices, are provided. In an exemplary embodiment of a method for providing images, a target image is partitioned into a plurality of partial images. One of the partial images is respectively captured and transmitted from a device with a camera capability to a host. The partial images are combined to generate the target image on the host.

An exemplary embodiment of a device comprises a camera and a processing unit. The processing unit partitions a target image into a plurality of partial images, and respectively captures one of the partial images using the camera and transmits it to a host. The partial images are combined to generate the target image on the host Methods and systems for providing images may take the form of program code embodied in a tangible media. When the program code is loaded into and executed by a machine, the machine becomes an apparatus for practicing the disclosed method.

DESCRIPTION OF THE DRAWINGS

Methods and systems for providing images and related devices will become more fully understood by referring to the following detailed description with reference to the accompanying drawings, wherein.

DESCRIPTION

Methods and systems for providing images and related devices are provided.

Figure 1:
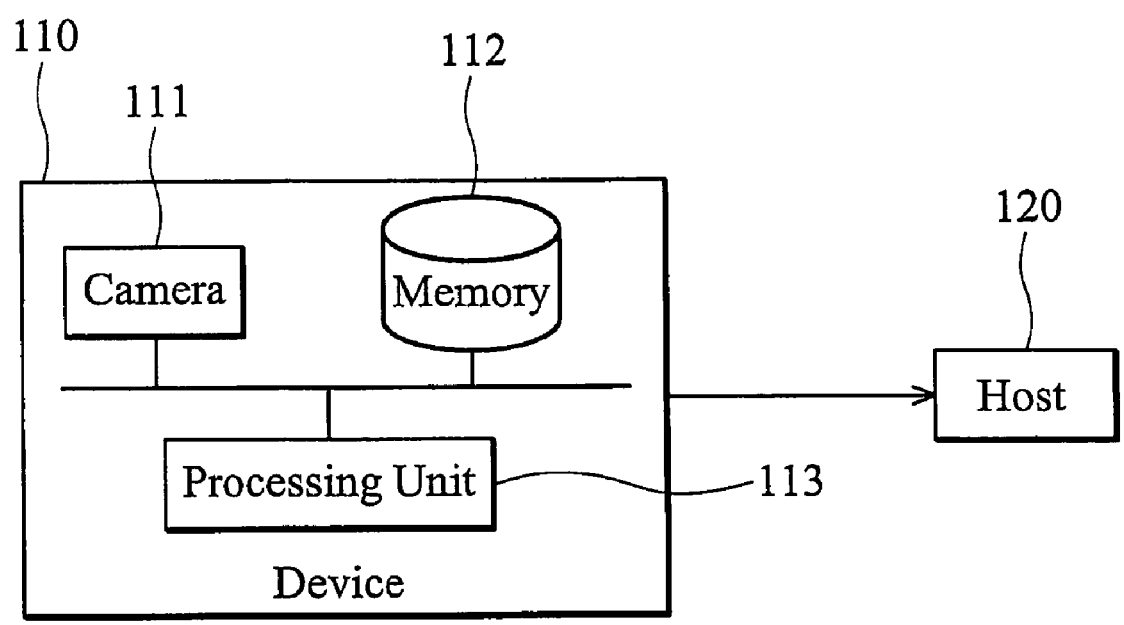
FIG. 1 is a schematic diagram illustrating an embodiment of a system for providing images.

FIG. 1 is a schematic diagram illustrating an embodiment of a system for providing images. The system includes a device 110 and a host 120. The device 110 is an embedded system, such as a mobile phone with a camera capability. The device 110 comprises a camera 111, a memory 112, and a processing unit 113. The camera 111 has at least a sensor (not shown) to sense and capture images based on instructions of the processing unit 113. The captured images can be stored in the memory 112. The processing unit 113 performs related operations on the device 110. The host 120 may be a computer system, for receiving images from the device 110 and generating images using the received images. The host 120 is also used for performing related operations, such as camera tuning and image analysis. Additionally, the device 110 may further include a compression unit (not shown) to compress the respective captured images. The host 120 may further include a decompression unit (not shown) to decompress the respective received images.

Figure 2:
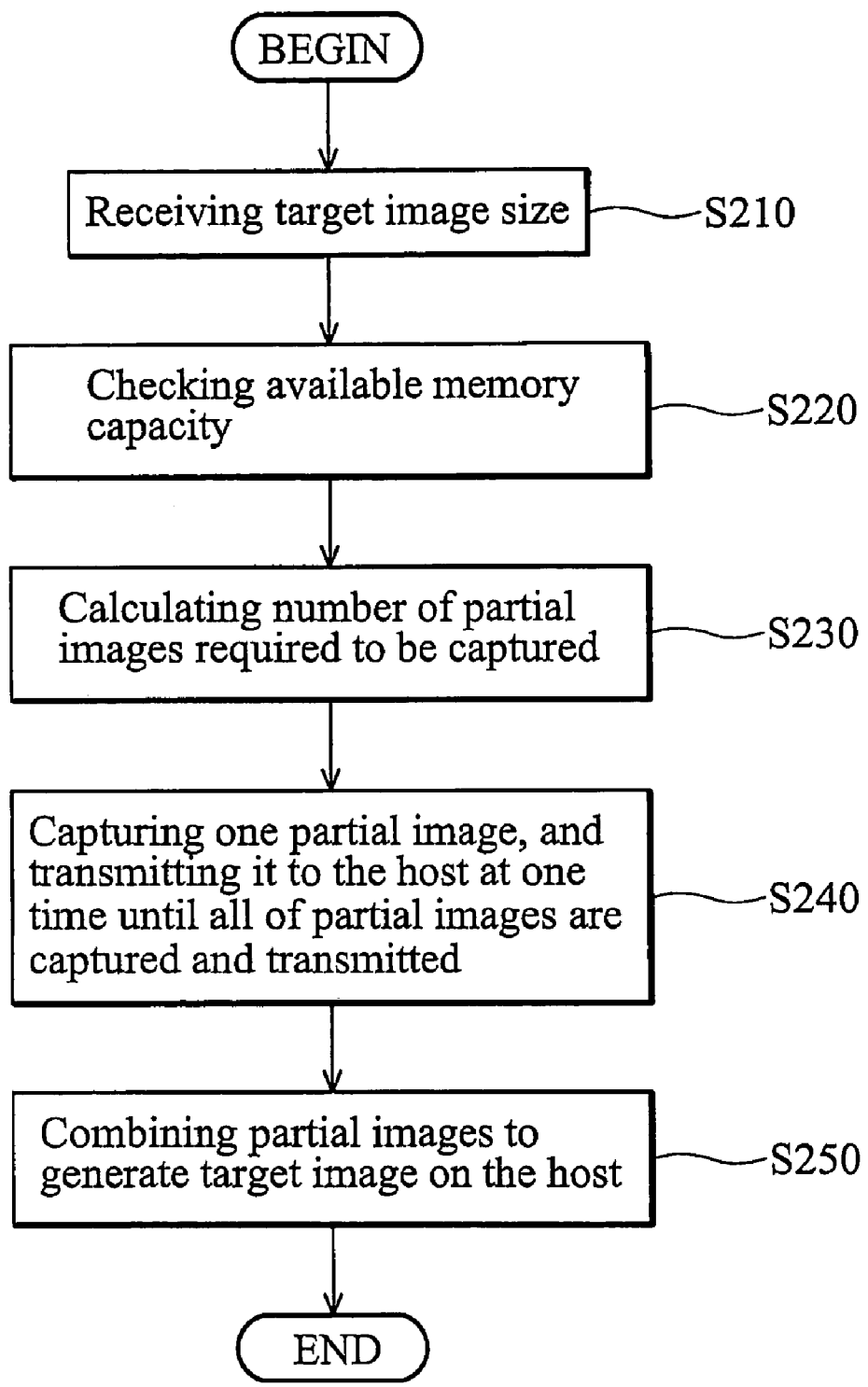
FIG. 2 is a flowchart showing an embodiment of a method for providing images.

FIG. 2 is a flowchart showing an embodiment of a method for providing images. Here, the host 120 is used for tuning or processing a target image, and the size of the target image is predetermined or dynamically set up. First, in step S210, the size of the target image is obtained. It is understood that the size of the target image can be set via the device 110 (mobile phone), or by the host 120 (computer system). Then, in step S220, the available memory capacity of the device 110 is determined. In some embodiments, the determination of the available memory capacity can be performed by the processor (processing unit) of the device 110 or the host 120. It is understood that the device 110 cannot capture an image when its size exceeds the available memory capacity. In step S230, the number of partial images requiring capture is calculated according to the size of the target image and the available memory capacity. Additionally, the size of respective partial image can be also determined. Similarly, the calculation and determination can be performed by the processor of the device 110 or the host 120. Then, in step S240, respective partial image is captured/obtained and transmitted to the host at one time until all of the partial images are captured and transmitted. In some embodiments, the sensor can sense the area regarding one specific partial image to obtain the specific partial image. For example, the sensor receives coordinates of two points, and senses the data between the two points. The area being sensed by the sensor can be controlled by the processor of the device 110 or the host 120. In some embodiments, the sensor can sense the entire image, but the processing unit 113 only keeps and processes the data regarding one specific partial image to obtain the specific partial image. However, the operations of keeping and processing image data of the processing unit 113 of the device 110 can also be controlled by the processor of the host 120. In step S250, the partial images are combined to generate the target image on the host. It is understood that an index can be assigned to each of the partial images for further image combination. The partial images are combined accordingly on the host 120.

It is understood that, the execution of all of the operations, excepting step S250, can be controlled by the processor of the device 110 or the host 120. For example, capturing images of the sensor, calculation of available memory capacity and partial image size, and obtaining and transmission of partial images can be controlled by the processor of the device 110 or the host 120.

Figure 3:
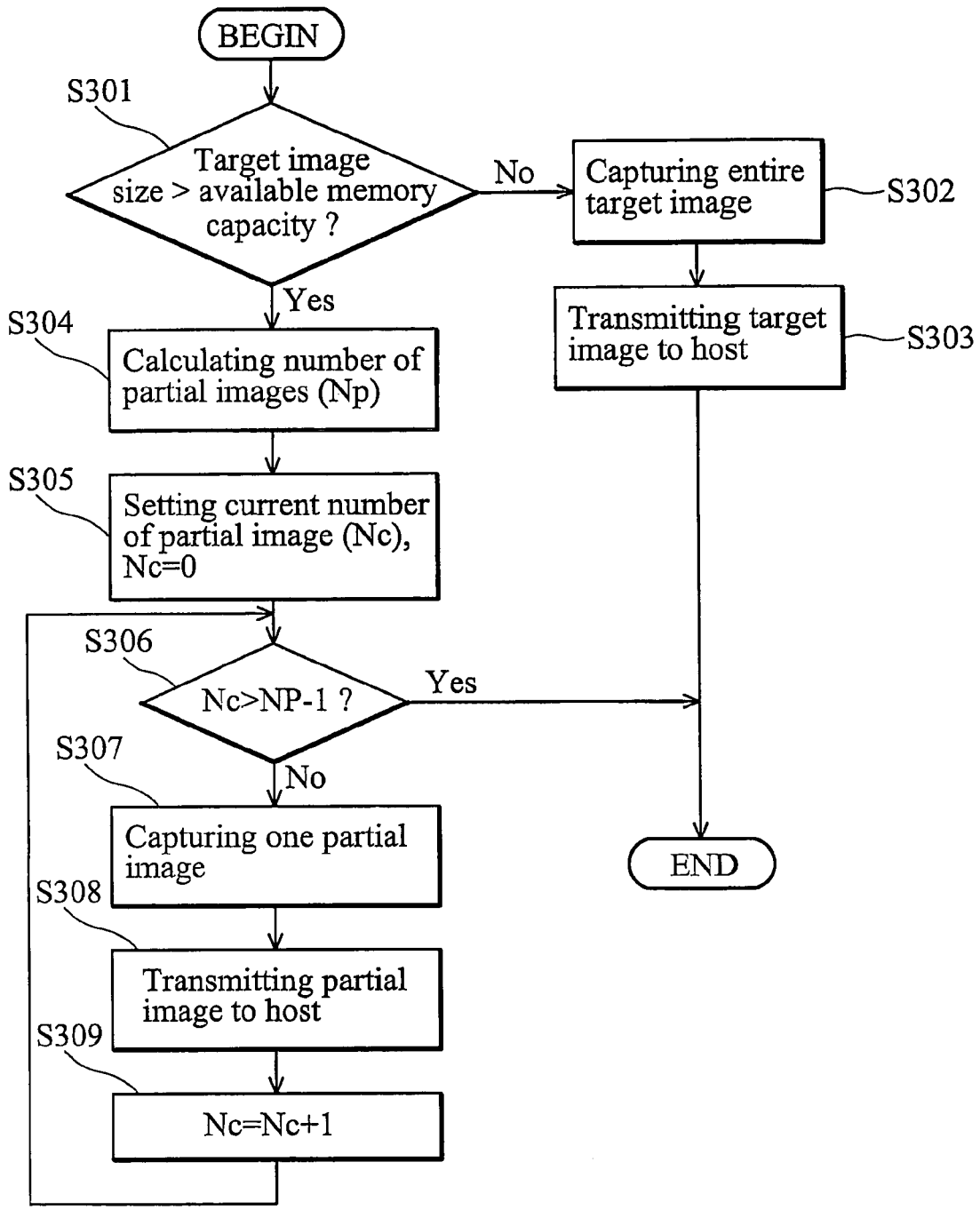
FIG. 3 is a flowchart showing an example of providing images on a device.

In other words, in some embodiments, the operations of capturing images of the sensor, calculation of available memory capacity and partial image size, obtaining and transmission of partial images, and combination of the partial images are controlled by the processor of the host, such as a personal computer, and therefore, a particular software program for controlling the mentioned operations has to be installed in that computer. In some embodiments, the operations of capturing images of the sensor, calculation of available memory capacity and partial image size, and obtaining together with transmission of partial images are controlled by the processor of the device 110, such as a mobile phone, and the operation of combination of the partial images is controlled by the processor of the host, such as the personal computer, and therefore, a particular software program for controlling the mentioned operations except that of combination of partial images has to be installed in that mobile phone while another particular software program for controlling the operation of combination of partial images has to be installed in that personal computer. FIG. 3 is a flowchart showing an example for providing images on a device. In the example, a scan line is used as a unit to partition the target images. That is, the widths of each of the respective partial images are the same as the target image (equal to the length of a scan line) whereas the height (number of lines) of the respective partial images may be different. First, in step S301, it is determined whether the size of a target image exceeds the available memory capacity. If not (No in step S301), in step S302, the entire target image is captured at one time, and in step S303, transmitted to the host 120 for further processing, such as camera tuning. If so (Yes in step S301), in step S304, the number of partial images (Np) requiring capture is calculated. In step S305, a current number of a captured partial image (Nc) is set to 0. It is understood that the size of respective partial images must be less than the available memory capacity.

Figure 4:
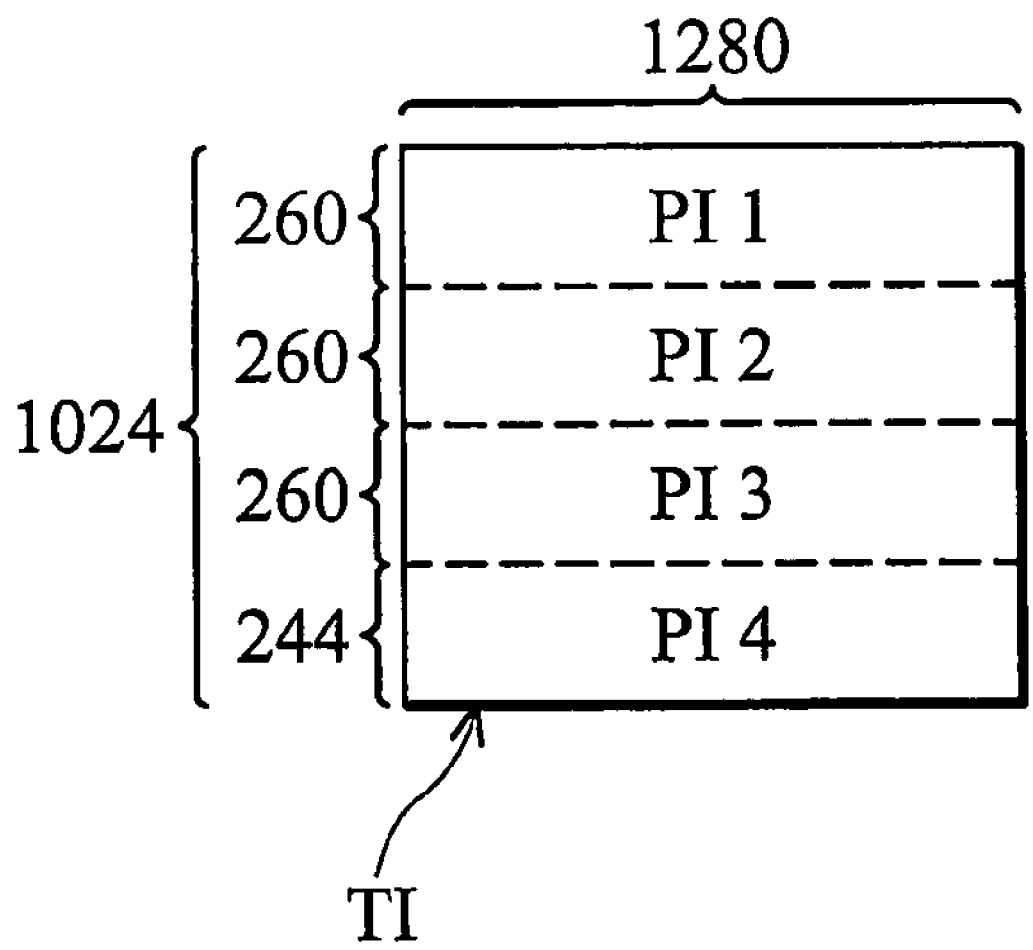
FIG. 4 shows the relationship between a target image and partial images corresponding to FIG. 3.

FIG. 4 shows the relationship between a target image and partial images corresponding to FIG. 3. If the size of the target image TI is 1280×1024 (3.84 MB) and 1 MB of available memory capacity is provided, the number of partial images would be 4. Here, the size of respective partial images PI 1, PI 2 and PI 3 is 1280×260 (975 KB) and the size of partial images PI 4 is 1280×244 (915 KB).

In step S306, it is determined whether Nc is greater than Np−1. If so (Yes in step S306), the procedure is complete. If not (No in step S306), in steps S307 and S308, one partial image is captured and transmitted to the host 120 at one time, and in step S309, Nc is set to Nc+1, and the procedure returns to step S306. Steps S306 to S309 repeat until all of the partial images are captured and transmitted to the host 120. After receiving all of the partial images, the host 120 can generate the target image using the partial images based on the received order or the index of respective partial images, and perform related operations, such as camera tuning based on the target image.

Figure 6:
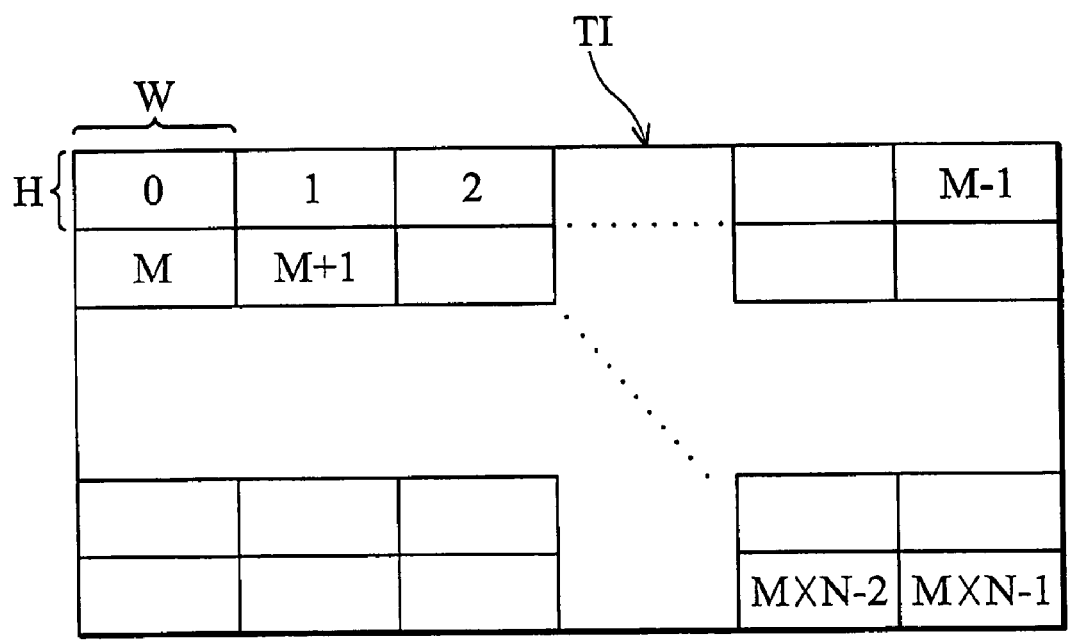
FIG. 6 shows the relationship between a target image and partial images corresponding to FIG. 5.

On the other hand, instead of using a scan line as a unit to scan and partition the target image as shown in FIG. 3 and FIG. 4, it should be noted that a block could also be used as a unit to partition the target image. As shown in FIG. 4, while the scan unit is a line, the partial images are rectangle blocks with the same width. While the scan unit is a block, as shown in FIG. 6, the block could be a rectangular or square block in any size, and a partial image will have a predetermined number of blocks based one the sizes of the partial image and the blocks the partial image having, and the size of the partial image will depend on the number of blocks the partial image having and the sizes of that blocks. The size of the block should be predetermined by the processor of the device 110 or the host 120. Furthermore, every block should be indexed in a specific order for further operations of the host 120. The index order could be either sequential or non-sequential. Any manners to index the blocks can be applied to this invention if the host 120 can further combine the partial images based on the index.

Figure 5:
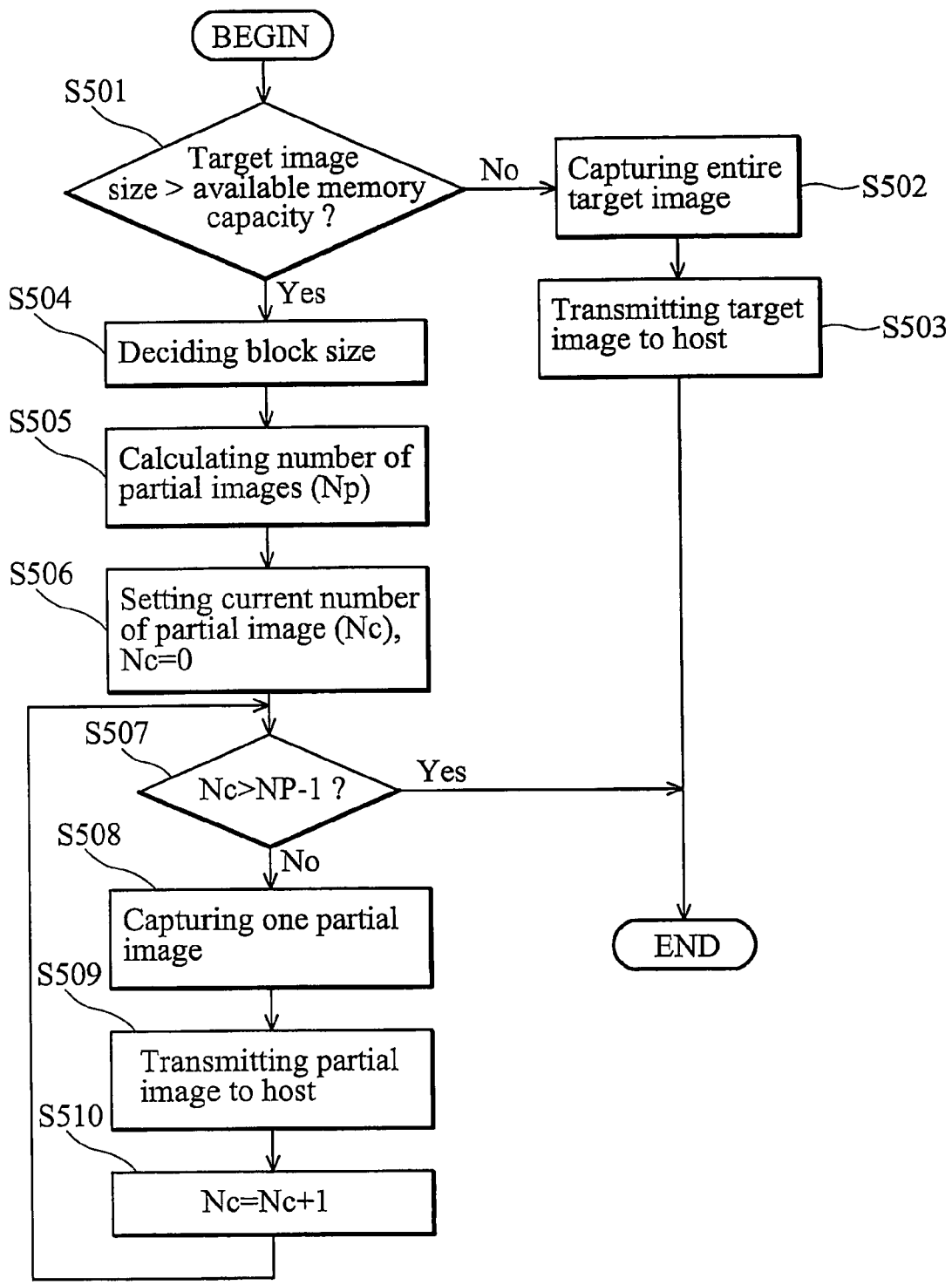
FIG. 5 is a flowchart showing an example of providing images on a device.

FIG. 5 is a flowchart showing an example for providing images on a device. In the example, the partial images are randomly partitioned. First, in step S501, it is determined whether the size of a target image exceeds the available memory capacity. If not (No in step S501), in step S502, the entire target image is captured at one time, and in step S503, transmitted to the host 120 for further processing, such as camera tuning. If so (Yes in step S501), in step S504, the block size for respective partial images is decided. Many partial images may have the same block size, and the block size must be less than the available memory capacity. In step S505, the number of partial images (Np) requiring capture is calculated, and in step S506, a current number of a captured partial image (Nc) is set to 0.

FIG. 6 shows the relationship between a target image and partial images corresponding to FIG. 5. In FIG. 6, the block size for most partial images is W×H, in which W is the height of the block and H is the width, and the number of partial images is M×N (Np). It is understood that the size of respective partial images may be different. For example, the size of partial images PI 0, PI M−1, PI M×N−2, and PI M×N−1 are different. The size of other partial images can be calculated according to W, H, and the size of the target image. The size information can be further notified to the host 120 for combining the partial images.

In step S507, it is determined whether Nc is greater than Np−1. If so (Yes in step S507), the procedure is complete. If not (No in step S507), in steps S508 and S509, one partial image is captured and transmitted to the host 120 at one time, and in step S510, Nc is set to Nc+1, and the procedure returns to step S507. Steps S507 to S510 repeat until all of the partial images are captured and transmitted to the host 120. After receiving all of the partial images, the host 120 can generate the target image using the partial images based on the received order or the index of respective partial images, and perform related operations, such as camera tuning based on the target image. It is understood that if the partial images are captured, processed and transmitted in order, these partial images can be combined based on the received order of the partial images. In this case, the assignment of the index of respective partial images can be skipped. In some embodiments, if the partial images are randomly captured, processed and transmitted, these partial images can be combined based on the index of respective partial images.

Methods and systems for providing images, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer or a device comprising a mobile phone, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer or a device comprising a mobile phone, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for providing images, comprising:
    partitioning a target image into a plurality of partial images;
    capturing and transmitting the partial images from a device with a camera capability to a host one by one until all of the partial images are transmitted to the host; and
    combining the transmitted partial images to generate the target image on the host,
    wherein the device has an available memory capacity and the number of the partial images and the size thereof are calculated by the device according to the available memory capacity of the device and the size of the target image.

2. The method of claim 1 further comprising assigning an index to each of the partial images, and the partial images are combined accordingly.

3. The method of claim 1 further comprising compressing the respective partial images on the device, and decompressing the respective partial images on the host before the combination of the partial images.

4. The method of claim 1 further comprising sensing one respective partial image area to obtain the respective partial image.

5. The method of claim 1 further comprising sensing the entire target image area, and keeping the data regarding one respective partial image to obtain the respective partial image.

6. The method of claim 1 further comprising performing a camera tuning for the device on the host according to the target image.

7. The method of claim 1 wherein the device comprises a mobile phone.

8. A system for providing images, comprising:
    a device with a camera capability, for partitioning a target image into a plurality of partial images, and for capturing and transmitting the partial images one by one until all of the partial images are transmitted; and
    a host coupled to the device, for receiving the transmitted partial images, and after reception of all of the transmitted partial images, for combining the received partial images to generate the target image thereon,
    wherein the device has an available memory capacity, the device further calculates the number of the partial images and the size thereof according to the available memory capacity of the device and the size of the target image.

9. The system of claim 8 wherein the device further assigns an index to each of the partial images, and the partial images are combined accordingly on the host.

10. The system of claim 8 wherein the device further compresses the respective partial images, and the host further decompresses the respective partial images before the combination of the partial images.

11. The system of claim 8 wherein the device further senses one respective partial image area to obtain the respective partial image.

12. The system of claim 8 wherein the device further senses the entire target image area, and the data regarding one respective partial image is kept to obtain the respective partial image.

13. The system of claim 8 wherein the host further performs a camera tuning for the device according to the target image.

14. The system of claim 8 wherein the device comprises a mobile phone.

15. A device, comprising:
    a camera; and
    a processing unit coupled to the camera, for partitioning a target image into a plurality of partial images, wherein the processing unit captures the partial images using the camera and transmits it to a host one by one until all of the partial images are transmitted to the host,
    wherein after all of the partial images are transmitted to the host, the transmitted partial images are combined to generate the target image on the host, the device has an available memory capacity, and the processing unit further calculates the number of the partial images and the size thereof according to the available memory capacity of the device and the size of the target image.

16. The device of claim 15 wherein the processing unit further assigns an index to each of the partial images, and the partial images are combined accordingly on the host.

17. The device of claim 15 further comprising a compression unit to compress the respective partial images, and the host further comprises a decompression unit to decompress the respective partial images before the combination of the partial images.

18. The device of claim 15 wherein the camera further receives instructions to sense one respective partial image area to obtain the respective partial image.

19. The device of claim 15 wherein the camera further receives instructions to sense the entire target image area, and the data regarding one respective partial image is kept to obtain the respective partial image.

20. The device of claim 15 wherein the device is a mobile phone.

21. A device, comprising:
    means for partitioning a target image into a plurality of partial images; and
    means for capturing and transmitting the partial images to a host one by one until all of the partial images are transmitted to the host,
    wherein after all of the partial images are transmitted to the host, the transmitted partial images are combined to generate the target image on the host, the device has an available memory capacity, and the number of the partial images and the size thereof are calculated by the device according to the available memory capacity of the device and the size of the target image.

22. A computer program, residing on a machine-readable storage medium, which when executed by an electronic device, causes the electronic device to perform a method for providing images, the method comprising:
    partitioning a target image into a plurality of partial images;
    capturing and transmitting the partial images to a host one by one until all of the partial images are transmitted to the host; and
    combining the transmitted partial images to generate the target image on the host,
    wherein the device has an available memory capacity and the number of the partial images and the size thereof are calculated by the device according to the available memory capacity of the device and the size of the target image.

* * * * *